No. 877,405. PATENTED JAN. 21, 1908.
J. CAILLET.
FRICTION CLUTCH.
APPLICATION FILED SEPT. 10, 1907.

Witnesses:-

Inventor,
Jules Caillet
by his Attorney.

UNITED STATES PATENT OFFICE.

JULES CAILLET, OF PARIS, FRANCE, ASSIGNOR TO SOCIÉTÉ ANONYME DES AUTOMOBILES PEUGEOT, OF PARIS, FRANCE.

FRICTION-CLUTCH.

No. 877,405.

Specification of Letters Patent.

Patented Jan. 21, 1908.

Application filed September 10, 1907. Serial No. 392,127.

*To all whom it may concern:*

Be it known that I, JULES CAILLET, civil engineer, citizen of France, residing at 66 Avenue de la Grande Armée, Paris, in the Republic of France, have invented certain new and useful Improvements in Friction-Clutches, of which the following is a specification.

This invention has for its object to allow of obtaining progressive clutch action with a friction clutch suitable, for example, for use in connection with the driving mechanism of motor-cars.

The invention substantially consists in distorting the surface of the leather which covers a clutch cone, in such a manner as to convert the conical leather surface into a surface with protuberances having rounded angles, this being effected by introducing under the leather, along a certain number of elements of the cone, rods of india-rubber partly located in grooves in the cone. When the cone is moved into contact with the internal conical surface of the fly wheel, the rounded corners of the protuberances, which touch the former, at first slip, and then the slip diminishes and the engagement proceeds progressively in proportion as the friction surface tends to resume its conical shape by the crushing of the india-rubber rods; when the two conical surfaces have entered into contact at all their points the engagement is complete.

The annexed drawing shows by way of example a construction embodying the invention.

Figure 1:
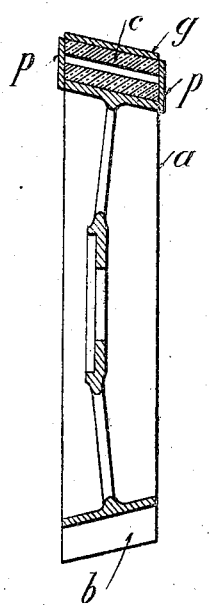
Figure 2:
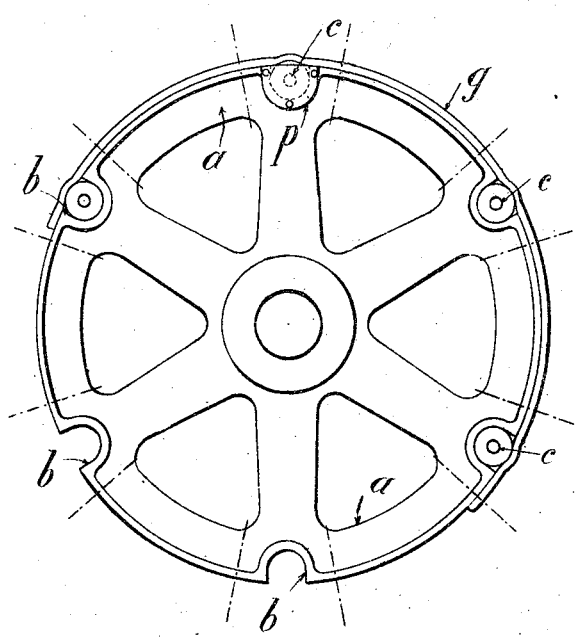

Figure 1 is a side-view of the clutch-cone, partly in section, and Fig. 2 a front view, with certain parts removed.

The clutch cone $a$ has at its circumference a certain number of grooves $b$ lying along elements of the cone-surface. These grooves are semi-circular at their bottoms and serve for the reception of small hollow rods of india-rubber $c$. The grooves are slightly wider than they are deep, and the india-rubber rods protrude beyond the circumferential surface of the cone as shown in the drawing.

The rods are not placed in position until the leather $g$ has been placed on the cone and smoothed, so that this operation is not interfered with. Then the rods are introduced by hand under the leather, lifting the latter with a small lever near the groove.

At each end of the rods small plates $p$ are fixed to the cone, to prevent the said rods from slipping out of their housings.

The leather is fixed to the cone in the ordinary way by means of screws or rivets.

Instead of leaving the interiors of the hollow rods empty they can be filled up, after the adjustment, with a rod of metal or other suitable material, allowing of regulating the elasticity of the rods.

The progressiveness of the clutch-action is in no way modified when the direction of rotation is changed, or when the driving member becomes the driven member, or vice-versa.

Having now described my invention, what I claim as new and desire to secure by Letters Patent is:

A friction clutch member comprising a clutch cone $a$, semicircular grooves $b$ provided on said cone and lying along elements of the cone surface, hollow india-rubber rods $c$ located in said grooves $b$ and slightly protruding beyond the circumferential surface of the cone, a leather envelop $g$ extended upon the cone surface and upon the protruding portions of the hollow india-rubber rods, and small plates $p$ fixed to the cone opposite said rods to prevent same from slipping out their housings, substantially as described and for the purpose set forth.

In testimony whereof I have affixed my signature in presence of two witnesses:

JULES CAILLET.

Witnesses:
    LOUIS MOSÉ,
    H. C. COXE.